Figure 1:
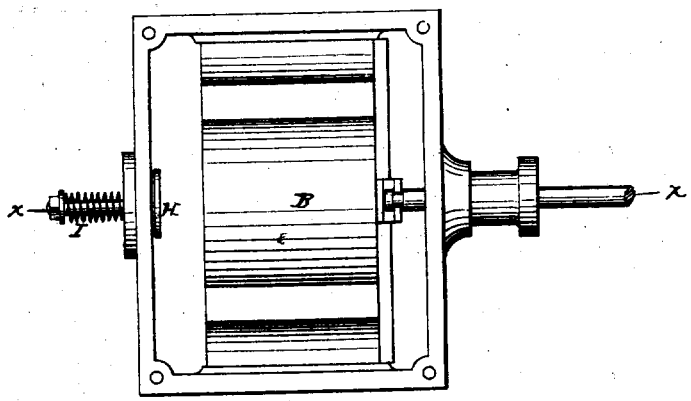

J. NESBITT.

Slide-Valves for Steam-Engines.

No. 5,310. Reissued March 4, 1873.

*Witnesses:*

John Bunsen

Harry Coleman

*Inventor:*

John Nesbitt by his atty Hooker

AM. PHOTO-LITHOGRAPHIC CO. N.Y. (OSBORNE'S PROCESS.)

UNITED STATES PATENT OFFICE.

JOHN NESBITT, OF EAST BOSTON, MASS., ASSIGNOR TO WILLIAM G. ULERY.

IMPROVEMENT IN SLIDE-VALVES FOR STEAM-ENGINES.

Specification forming part of Letters Patent No. 110,490, dated December 27, 1870; reissue No. 5,310, dated March 4, 1873.

DIVISION B.

*To all whom it may concern:*

Be it known that I, JOHN NESBITT, formerly of Concord, New Hampshire, now of East Boston, in the State of Massachusetts, have invented certain new and useful Improvements in Slide-Valves for Steam-Engines, of which the following is a specification:

This invention is designed to relieve the vacuum in the steam-cylinder of an engine which is formed when, after the steam is shut off, the engine continues in motion, as in the case of a locomotive traveling on a descending grade with steam shut off. In this case a vacuum is formed behind the moving piston in the steam-cylinder, which greatly retards the motion and injures the machinery.

In reissued Letters Patent of even date herewith, constituting one division of this reissue, I have represented a mode of overcoming this difficulty by means of one or more puppet-valves applied to the steam-valve or its inclosing-case, in passages leading from the exhaust-cavity of the steam-valve into the steam-space in the chest, and so arranged that when there is a tendency to a vacuum in the steam-chest they will automatically open to admit air from the exhaust into the chest, whence it will pass through the steam-ports into the cylinder. This arrangement necessitates drawing the supply of air through the exhaust—that is to say, it is taken in through the exhaust-port under the valve, and must pass through the latter before it can reach the steam-space of the chest.

The mode of overcoming the difficulty specified, which I shall now proceed to describe, differs from the one above stated in that the air is admitted into the steam-space of the chest not from beneath the valve and through the exhaust, but from above or outside of the valve and the exhaust. This is productive of advantage under some circumstances—as, for instance, when the exhaust-pipe opens into the smoke-stack of the locomotive, in which case the air taken in through the exhaust is apt to carry with it cinders and dirt, which will grind the valve face and seat, and, entering the cylinder, will wear and injure the piston. By providing for the automatic admission of air into the steam-chest from a point above or outside of the valve and exhaust no such liability is incurred, and the air may enter free from dust and cinder.

These improvements are especially applicable to balanced slide-valves—such, for instance, as shown in my patent of March 19, 1867—and it is to such a valve that they are represented as applied in the accompanying drawing, in which—

Figure 2:
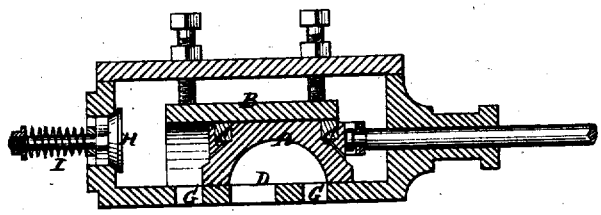

Figure 1 is a top view of the valve-chest with the cover removed; and Fig. 2 is a section of the same on line *x x*, Fig. 1.

A is a slide-valve, working steam-tight under the case B, for the purpose of balancing it, the said valve carrying sections of packing-rings in grooves C, working against the under side of case B, to which they are fitted steam-tight. D is the exhaust-port, and G the steam-ports. To prevent the formation of a vacuum, which will otherwise take place when, after steam is shut off, the engine of which the valve and chest may be supposed to form part, continues in motion, I provide, as above said, for the automatic admission of air at this time into the steam-space of the chest, from above or outside of the valve and exhaust.

The accompanying drawing represents an arrangement for this purpose, which I shall now proceed to describe.

In one of the sides of the steam-chest is located a puppet-valve, H, closing an opening or passage in the side of the chest, and arranged to open internally or toward the inside of the chest. When steam is let on the valve is kept closed by steam-pressure; but when steam is shut off and a vacuum is formed in the steam-chest by reason of the continuance of movement of the engine, the superior pressure of the outside atmosphere presses open the valve, and air is thus admitted into the steam-chest, and will thence flow through the steam-ports G and follow up the piston in the steam-cylinder, thereby preventing the formation of a vacuum in rear of said piston.

The valve H may be otherwise arranged and located, if preferred. It can, for instance, be placed in the top of the steam-chest.

A light spiral spring, I, may be employed to assist in closing the valve, and also to steady it, as will be readily understood without further explanation.

What I here claim, and desire to secure by Letters Patent, is—

In combination with the valve-chest the air-admission valve, operating automatically at the time and in the manner set forth, to admit air into said chest through a passage or opening leading from the exterior atmosphere, and entering the valve-chest at a point outside of the steam-valve and the exhaust, substantially as described.

In testimony whereof I have hereunto signed my name in presence of two subscribing witnesses.

JOHN NESBITT.

Witnesses:
EDM. F. BROWN,
JOHN BUCKLEY.